United States Patent
Choi et al.

(10) Patent No.: US 10,011,790 B2
(45) Date of Patent: Jul. 3, 2018

(54) SUPERCRITICAL WATER PROCESSES FOR UPGRADING A PETROLEUM-BASED COMPOSITION WHILE DECREASING PLUGGING

(71) Applicant: Saudi Arabian Oil Company, Dhahran (SA)

(72) Inventors: Ki-Hyouk Choi, Dhahran (SA); Muneef F. Al-Qarzouh, Dhahran (SA); Joo-Hyeong Lee, Dhahran (SA); Bader M. Al-Otaibi, Dhahran (SA); Abdullah T. Alabdulhadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/374,203

(22) Filed: Dec. 9, 2016

(65) Prior Publication Data
US 2017/0166824 A1 Jun. 15, 2017

Related U.S. Application Data

(60) Provisional application No. 62/267,401, filed on Dec. 15, 2015.

(51) Int. Cl.
*C10G 75/00* (2006.01)
*C10G 75/04* (2006.01)
(Continued)

(52) U.S. Cl.
CPC .............. *C10G 75/00* (2013.01); *C10G 9/00* (2013.01); *C10G 9/16* (2013.01); *C10G 31/08* (2013.01);
(Continued)

(58) Field of Classification Search
CPC .................... C10G 31/08; C10G 45/26; C10G 75/00–75/04
See application file for complete search history.

(56) References Cited

U.S. PATENT DOCUMENTS

| 4,465,888 A | 8/1984 | Paspek, Jr. |
| 4,591,426 A | 5/1986 | Krasuk et al. |

(Continued)

FOREIGN PATENT DOCUMENTS

| CA | 2938409 A1 | 8/2015 |
| EP | 1 342 771 A1 | 9/2003 |

(Continued)

OTHER PUBLICATIONS

Abdulrazak et al., "Problems of Heavy Oil Transportation in Pipelines and Reduction of High Viscosity", Iraqi Journal of Chemical and Petroleum Engineering, 2015, vol. 16, No. 3, 1-9.

(Continued)

*Primary Examiner* — Renee Robinson
(74) *Attorney, Agent, or Firm* — Dinsmore & Shohl LLP

(57) ABSTRACT

Embodiments of processes for upgrading a petroleum-based composition while decreasing plugging comprise mixing a supercritical water stream with a pressurized, heated petroleum-based composition in a mixing device to create a combined feed stream, and introducing to a supercritical upgrading reactor system are provided. The processes also comprise cooling the upgraded product in a cooling device, and decreasing the pressure of the cooled upgraded product in a pressure reducer. To reduce plugging, the processes also comprises injecting plug remover solution into one or more of the following injection locations: an injection port on a process line connecting the mixing device with the upgrading reactor system; an injection port on a process line connecting the upgrading reactor system with the cooling (Continued)

device; or an injection port on a process line connecting the cooling device with the pressure reducer.

29 Claims, 4 Drawing Sheets

(51) Int. Cl.
*C10G 31/08* (2006.01)
*C10G 45/26* (2006.01)
*C10G 9/00* (2006.01)
*C10G 45/72* (2006.01)
*C10G 47/32* (2006.01)
*C10G 49/00* (2006.01)
*C10L 10/04* (2006.01)
*C10G 9/16* (2006.01)

(52) U.S. Cl.
CPC .......... *C10G 45/26* (2013.01); *C10G 45/72* (2013.01); *C10G 47/32* (2013.01); *C10G 49/005* (2013.01); *C10G 49/007* (2013.01); *C10G 75/04* (2013.01); *C10L 10/04* (2013.01); *C10G 2300/1011* (2013.01); *C10G 2300/1037* (2013.01); *C10G 2300/4006* (2013.01); *C10G 2300/4012* (2013.01); *C10L 2290/58* (2013.01)

(56) References Cited

U.S. PATENT DOCUMENTS

| | | | |
|---|---|---|---|
| 4,822,497 | A | 4/1989 | Hong et al. |
| 5,387,398 | A | 2/1995 | Mueggenburg et al. |
| 5,454,950 | A | 10/1995 | Li et al. |
| 6,039,791 | A | 3/2000 | Kazeef et al. |
| 6,306,287 | B1 | 10/2001 | Billon et al. |
| 6,332,975 | B1 | 12/2001 | Abdel-Halim et al. |
| 6,365,790 | B2 | 4/2002 | Reimer et al. |
| 7,041,707 | B2 | 5/2006 | Hahn |
| 7,435,330 | B2 | 10/2008 | Hokari et al. |
| 7,591,983 | B2 | 9/2009 | Takahashi et al. |
| 7,594,387 | B2 | 9/2009 | Inage et al. |
| 7,740,065 | B2 | 6/2010 | Choi |
| 2006/0260927 | A1 | 11/2006 | Abazajian |
| 2008/0099374 | A1 | 5/2008 | He et al. |
| 2008/0099376 | A1 | 5/2008 | He et al. |
| 2008/0099378 | A1 | 5/2008 | He et al. |
| 2009/0139902 | A1 | 6/2009 | Kressmann et al. |
| 2009/0159489 | A1 | 6/2009 | Lopez et al. |
| 2009/0159498 | A1 | 6/2009 | Chinn et al. |
| 2009/0159504 | A1 | 6/2009 | Choi et al. |
| 2009/0166262 | A1 | 7/2009 | He et al. |
| 2011/0147266 | A1 | 6/2011 | Choi |
| 2012/0061291 | A1 | 3/2012 | Choi et al. |
| 2012/0061294 | A1* | 3/2012 | Choi ............... C10G 47/32 208/97 |
| 2012/0181217 | A1 | 7/2012 | Choi et al. |
| 2013/0140214 | A1 | 6/2013 | Choi |
| 2013/0206645 | A1 | 8/2013 | Yarbro |
| 2013/0319910 | A1 | 12/2013 | Koseoglu et al. |
| 2014/0135540 | A1 | 5/2014 | Iversen |
| 2014/0251871 | A1 | 9/2014 | Choi et al. |
| 2014/0275676 | A1 | 9/2014 | Sieli et al. |
| 2015/0321975 | A1 | 11/2015 | Choi et al. |
| 2016/0312129 | A1 | 10/2016 | Choi et al. |

FOREIGN PATENT DOCUMENTS

| | | |
|---|---|---|
| EP | 1 616 931 A1 | 1/2006 |
| EP | 1696019 A1 | 8/2006 |
| GB | 1298904 A | 1/1971 |
| JP | 2000109850 | 4/2000 |
| JP | 2003049180 | 2/2003 |
| KR | 100249496 B1 | 3/2000 |
| WO | 2008055152 A1 | 5/2008 |
| WO | 2013033301 A2 | 3/2013 |
| WO | 2015094948 A1 | 6/2015 |

OTHER PUBLICATIONS

Gateau et al., "Heavy Oil Dilution", Oil & Gas Science and Technology, 2004, vol. 59, No. 5, 503-509.
International Search Report and Written Opinion pertaining to PCT/US2016/066132 dated Mar. 21, 2017.
International Search Report and Written Opinion pertaining to PCT/US2016/066294 dated Mar. 21, 2017.
Ates et al., "The Role of Catalyst in Supercritical Water Desulfurization", Applied Catalysis B: Environmental, 2014, 147, 144-155, Elsevier B.V.
Badger et al., "Viscosity Reduction in Extra Heavy Crude Oils", 461-465, The Laboratory for Hydrocarbon Process Chemistry, The Pennsylvania State University.
Escallon, Maria M., "Petroleum and Petroleum/Coal Blends as Feedstocks in Laboratory-Scale and Pilot-Scale Cokers to Obtain Carbons of Potentially High Value", A Thesis in Fuel Science, 2008, The Pennsylvania State University Graduate School.
Hughes et al., "Conocophillips Delayed Coking Process", Handbook of Petroleum Refining Processes, 2003, Chapter 12, 3rd Edition, 12.3-12.31, McGraw-Hill, New York (NY).
Iqbal et al., "Unlocking Current Refinery Constraints", PTQ Q2 2008, www.digitalrefining.com/article/1000682.
Kishita et al., "Desulfurization of Bitumen by Hydrothermal Upgrading Process in Supercritical Water with Alkali", Journal of the Japan Petroleum Institute, 2006, 49 (4), 1779-185.
International Search Report and Written Opinion pertaining to PCT/US2016/066129 dated Mar. 13, 2017.
Notice of Allowance pertaining to U.S. Appl. No. 15/377,351 dated Nov. 7, 2018.
International Search Report and Written Opinion pertaining to PCT/US2016/066367 dated Nov. 10, 2017.
Office Action pertaining to U.S. Appl. No. 15/374,295 dated Oct. 31, 2017.
International Search Report pertaining to PCT International Application No. PCT/US2018/012027, filed Jan. 2, 2018, 5 pages.
Written Opinion pertaining to PCT International Application No. PCT/US2018/012027, filed Jan. 2, 2018, 6 pages.
Final Office Action dated Mar. 16, 2018, pertaining to U.S. Appl. No. 15/374,295, filed Dec. 9, 2016, 13 pages.
International Search Report dated Mar. 23, 2018 for International Application No. PCT/US2017/068464, filed Dec. 27, 2017, 6 pages.
Written Opinion dated Mar. 23, 2018 for International Application No. PCT/US2017/068464, filed Dec. 27, 2017, 5 pages.
Notice of Allowance and Fees Due dated May 14, 2018 pertaining to U.S. Appl. No. 15/374,289.

* cited by examiner

SUPERCRITICAL WATER PROCESSES FOR UPGRADING A PETROLEUM-BASED COMPOSITION WHILE DECREASING PLUGGING

CROSS REFERENCE TO RELATED APPLICATIONS

This application claims priority to U.S. Provisional Application 62/267,401, filed Dec. 15, 2015, which is incorporated by reference in its entirety.

TECHNICAL FIELD

Embodiments of the present disclosure generally relate to supercritical water processes for upgrading petroleum-based compositions, and more specifically relate to supercritical water upgrading processes which reduce plugging, especially plugging in process lines.

BACKGROUND

Systems for upgrading petroleum-based compositions often experience plugging in the process lines from coke or other sludge material. Plugging refers to a stoppage or sharp decrease of flow in the process line, which may slow or stop the upgrading process. Additionally, if, due to the formation of coke and plugging material in the process line, the process flow stops or slows down, the delayed or stalled flow may further exacerbate the formation of plugging material.

Plugging material is not limited to coke. Highly viscous material can also cause plugging. Supercritical water reactor effluent, which may be a mixture of water, converted heavy oil, and unconverted heavy oil, is often in an emulsion state. The viscosity of the water-hydrocarbon emulsion decreases with high temperature. Thus, such emulsions may not cause any problems in a reactor operating at a high temperature. However, after leaving the reactor, the effluent is cooled down by a heat exchanger, which increases viscosity. This increased viscosity mixture may cause plugging in the process lines and may slow or interrupt the upgrading process.

SUMMARY

Accordingly, ongoing needs exist for processes for upgrading petroleum-based compositions while reducing plugging in process lines. The present embodiments address these needs by injection plug remover solution into various locations of the supercritical reactor system to reduce and remove plugging in the process lines.

According to one embodiment, a process for upgrading a petroleum-based composition while decreasing plugging is provided. The process comprises mixing a supercritical water stream with a pressurized, heated petroleum-based composition in a mixing device to create a combined feed stream, and introducing the combined feed stream to an upgrading reactor system to produce an upgraded product, where the upgrading reactor system operates at a temperature greater than a critical temperature of water and a pressure greater than a critical pressure of water, and where the upgrading reactor system comprises one or more upgrading reactors. The process also comprises passing the upgraded product out of the upgrading reactor system, cooling the upgraded product with a cooling device to create a cooled upgraded product having a temperature less than 200° C., and decreasing the pressure of the cooled upgraded product with a pressure reducer to create a cooled, depressurized stream having a pressure from 0.05 megapascals (MPa) to 2.2 MPa. Moreover, the process comprises injecting plug remover solution into one or more injection locations at a temperature within 200° C. of a temperature of an internal fluid at the injection location and a pressure of 100% to 120% of the pressure of the internal fluid at the injection location, where the plug remover solution comprises an aromatic solvent and less than 500 parts per million (ppm) of water, and where the injection locations include one or more of: an injection port on a process line connecting the mixing device with the upgrading reactor system; an injection port on a process line connecting the upgrading reactor system with the cooling device or an injection port on a process line connecting the cooling device with the pressure reducer.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Figure 1:
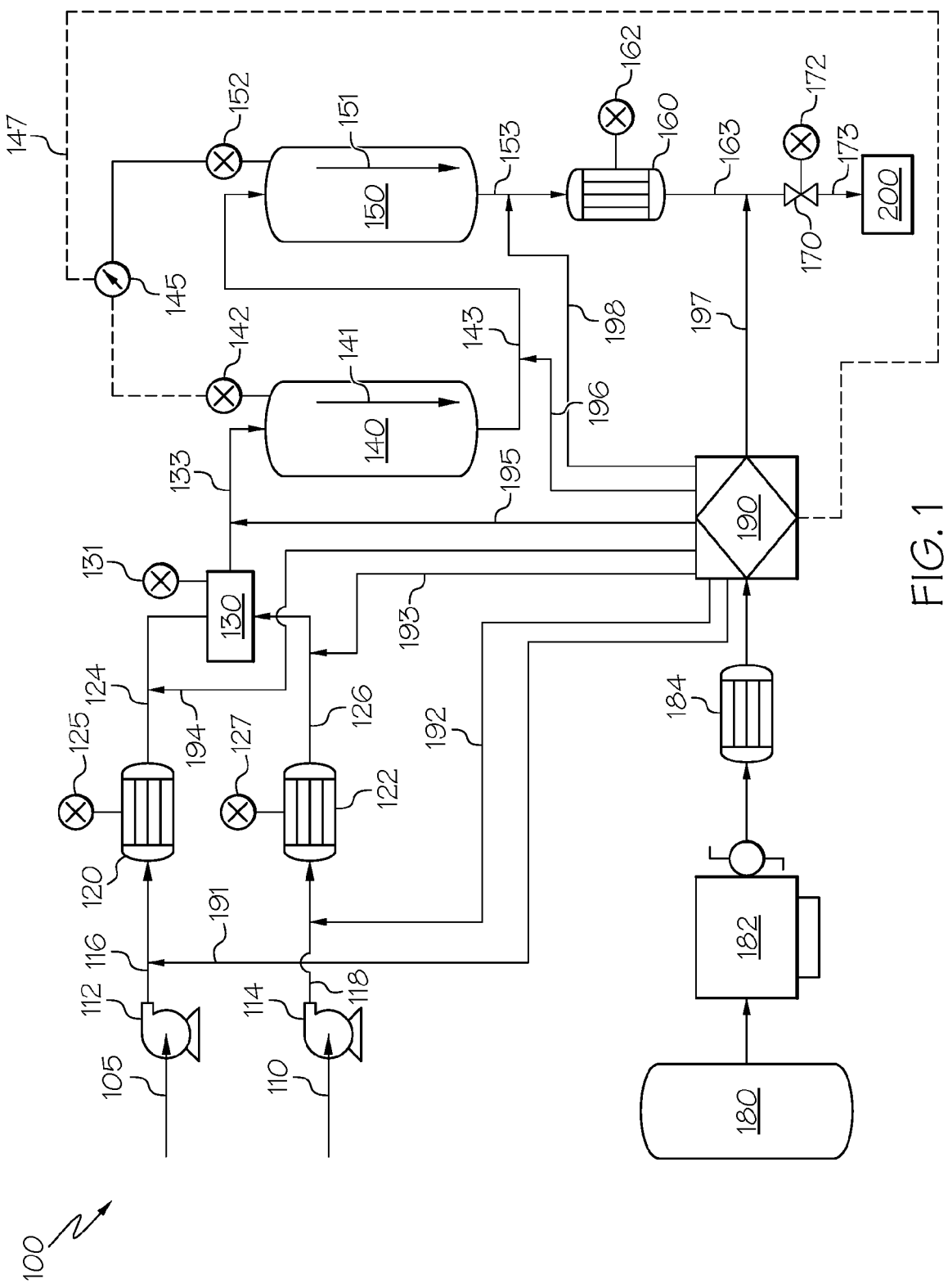
FIG. 1 is a schematic depiction of supercritical water systems for upgrading petroleum-based compositions, while reducing plugging in accordance with one or more embodiments of the present disclosure.

Embodiments of the present disclosure are directed to improving operation stability and performance of supercritical water processes for processing heavy oil. As stated previously, plugging by low solubility materials is commonly encountered when heavy oil is subjected to supercritical water processes. Embodiments of this disclosure are directed to removing such plugging materials by injecting plug remover solution into various process line locations under certain conditions.

Supercritical water has been proven to be an effective solvent or diluent in the thermal processing of heavy oil to reduce overcracking or coking. As used throughout the disclosure, "supercritical" refers to a substance at a pressure and a temperature greater than that of its critical pressure and temperature of water, such that distinct phases do not exist and the substance may exhibit the diffusion of a gas while dissolving materials like a liquid. At a temperature and pressure greater than the critical temperature and pressure, the liquid and gas phase boundary of water disappears, and the fluid has characteristics of both liquid and gaseous substances. Supercritical water is able to dissolve organic compounds like an organic solvent and has excellent diffusibility like a gas. Regulation of the temperature and pressure allows for continuous "tuning" of the properties of the supercritical water to be more liquid or more gas like. Supercritical water has reduced density and lesser polarity, as compared to liquid-phase sub-critical water, thereby greatly extending the possible range of chemistry, which can be carried out in water.

Without being bound by theory, supercritical water has various unexpected properties as it reaches supercritical boundaries. Supercritical water has very high solubility toward organic compounds and has an infinite miscibility with gases. Furthermore, radical species can be stabilized by supercritical water through the cage effect (that is, a condition whereby one or more water molecules surrounds the radical species, which then prevents the radical species from interacting). The stabilization of radical species may help prevent inter-radical condensation and thereby reduces the overall coke production in the current embodiments. For example, coke production can be the result of the inter-radical condensation. In certain embodiments, supercritical water generates hydrogen gas through a steam reforming reaction and water-gas shift reaction, which is then available for the upgrading reactions.

In the supercritical water process, thermal cracking reactions may be controlled by the presence of supercritical water to avoid overcracking and coking. Supercritical water has a very low dielectric constant which makes it compatible with common organic solvents such as toluene and dichloromethane. While supercritical water can dissolve a wide range of hydrocarbons, the high temperature conditions of supercritical water can cause other side reactions before the supercritical water dissolves hydrocarbons. For example, the exposure of benzopyrene to water in high temperature conditions for a longer period than desirable can cause the formation of coke.

Figure 2:
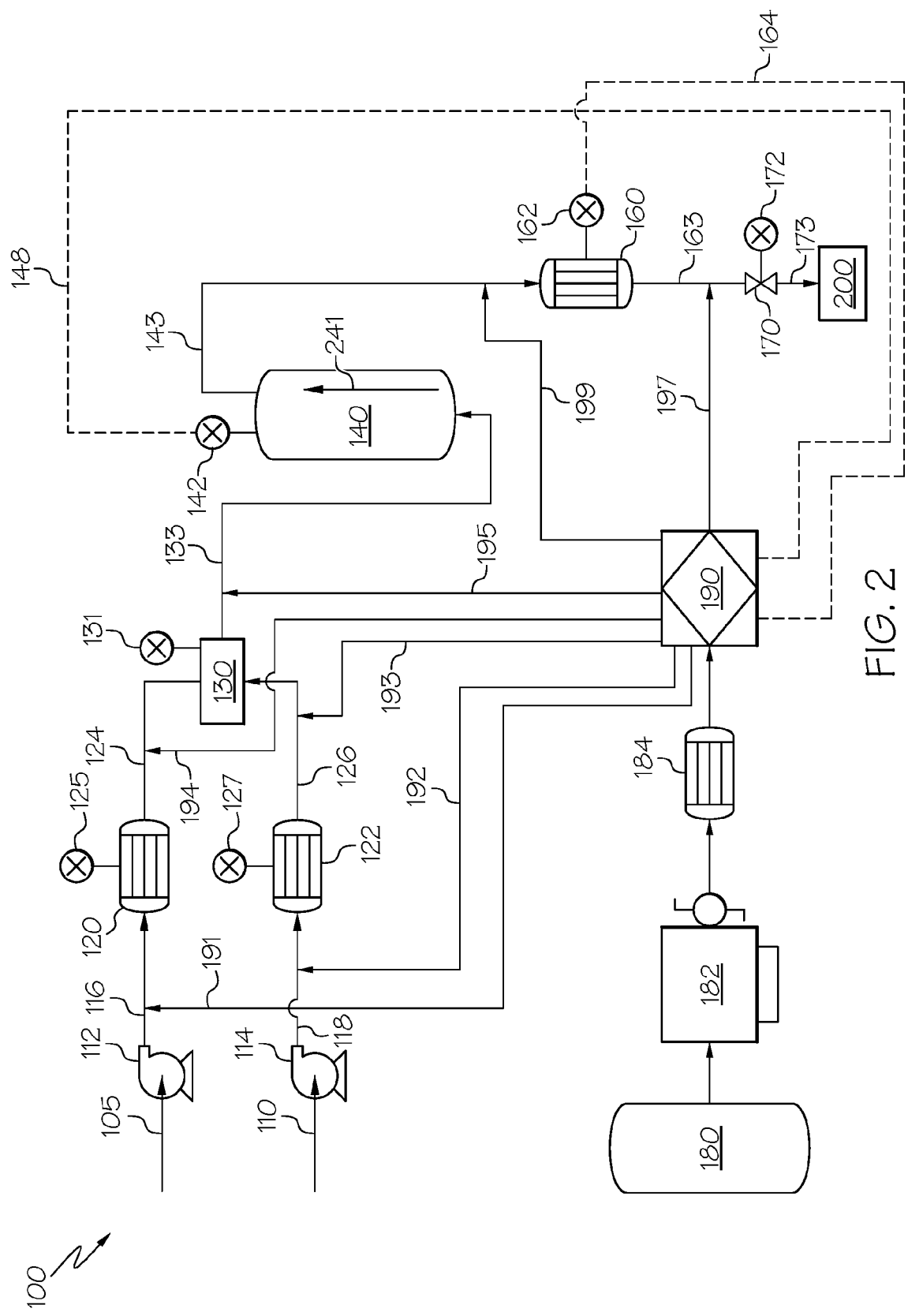
FIG. 2 is another schematic depiction of supercritical water systems for upgrading petroleum-based compositions, while reducing plugging in accordance with one or more embodiments of the present disclosure.
Figure 3:
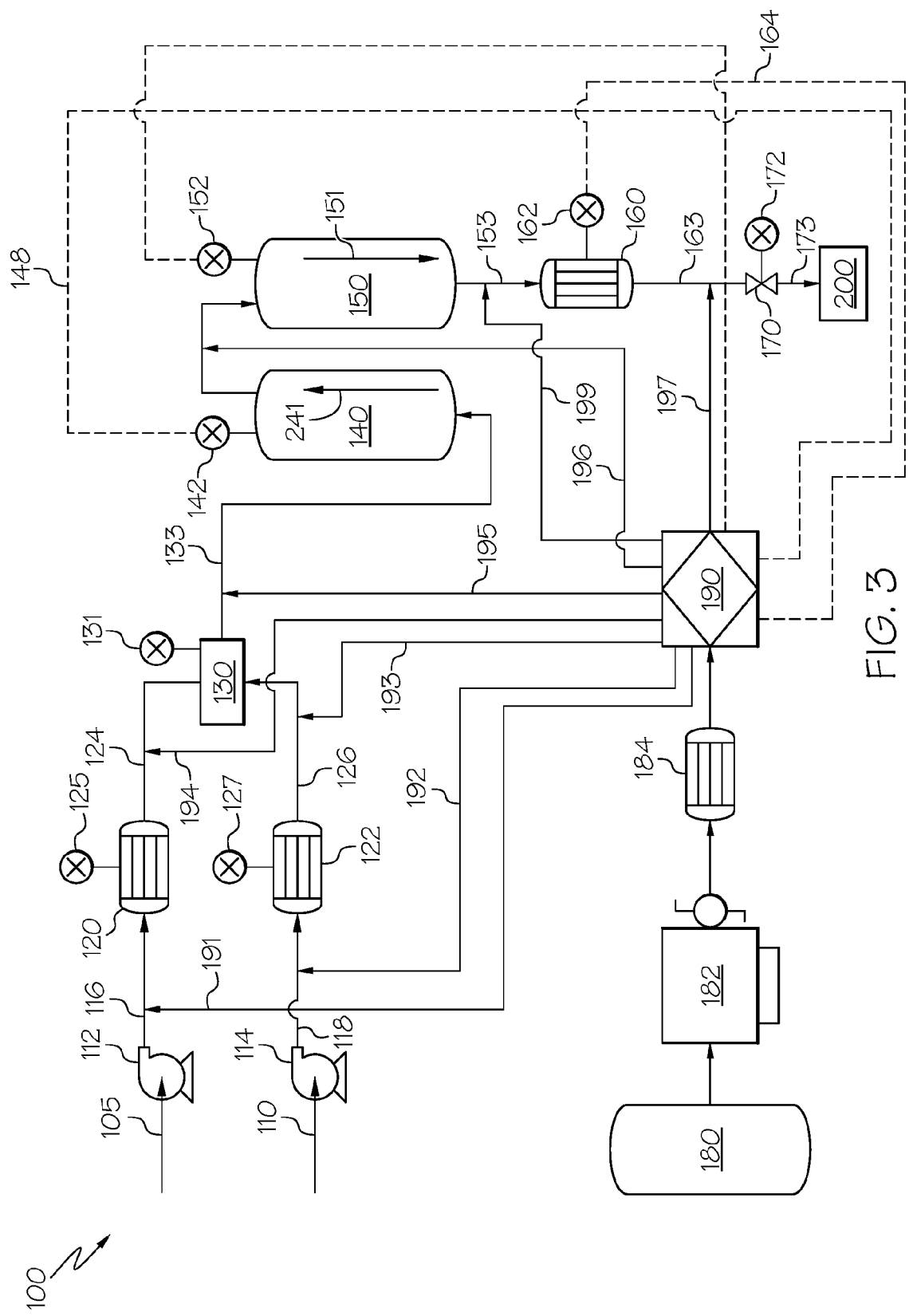
FIG. 3 is a further schematic depiction of supercritical water systems for upgrading petroleum-based compositions, while reducing plugging in accordance with one or more embodiments of the present disclosure.

Referring to FIGS. 1-3, embodiments of a process 100 for upgrading a petroleum-based composition 105 in the presence of supercritical water are provided. The petroleum-based composition 105 may refer to any hydrocarbon source derived from petroleum, coal liquid, or biomaterials. Exemplary hydrocarbon sources for petroleum-based composition 105 may include whole range crude oil, distilled crude oil, residue oil, topped crude oil, product streams from oil refineries, product streams from steam cracking processes, liquefied coals, liquid products recovered from oil or tar sands, bitumen, oil shale, asphaltene, biomass hydrocarbons, and the like. In one embodiment, the petroleum-based composition 105 may include atmospheric residue oil.

As shown in FIGS. 1-3, the petroleum-based composition 105 may be pressurized in a pump 112 to create a pressurized, petroleum-based composition 116. The pressure of pressurized, petroleum-based composition 116 may be at least 22.1 MPa, which is approximately the critical pressure of water. Alternatively, the pressure of the pressurized, petroleum-based composition 116 may be between 22.1 MPa and 32 MPa, or between 23 MPa and 30 MPa, or between 24 MPa and 28 MPa. In some embodiments, the pressure of the pressurized petroleum-based composition 116 may be between 25 MPa and 29 MPa, 26 MPa and 28 MPa, 25 MPa and 30 MPa, 26 MPa and 29 MPa, or 23 MPa and 28 MPa.

Referring again to FIGS. 1-3, the pressurized, petroleum-based composition 116 may then be heated in one or more petroleum pre-heaters 120 to form a pressurized, heated petroleum-based stream 124. In one embodiment, the pressurized, heated petroleum-based stream 124 has a pressure greater than the critical pressure of water as described previously and a temperature greater than 75° C. Alternatively, the temperature of the pressurized, heated petroleum-based stream 124 is between 10° C. and 300° C., or between 50° C. and 250° C., or between 75° C. and 200° C., or between 50° C. and 150° C., or between 50° C. and 100° C. In some embodiments, the temperature of the pressurized, heated petroleum-based stream 124 may be between 75° C. and 225° C., or between 100° C. and 200° C., or between 125° C. and 175° C., or between 140° C. and 160° C.

Embodiments of the petroleum pre-heater 120 may include a natural gas fired heater, heat exchanger, or an electric heater. For example, the pressurized, heated petroleum-based stream 124 may be heated in a double pipe heat exchanger or shell tube heat exchanger.

As shown in FIGS. 1-3, the water stream 110 may be any source of water, for example, a water stream having a conductivity of less than 1 microsiemens (μS)/centimeters (cm), such as less than 0.5 μS/cm or less than 0.1 μS/cm. Exemplary water streams 110 include demineralized water, distilled water, boiler feed water (BFW), and deionized water. In at least one embodiment, water stream 110 is a boiler feed water stream. Water stream 110 is pressurized by pump 114 to produce a pressurized water stream 118. The pressure of the pressurized water stream 118 is at least 22.1 MPa, which is approximately the critical pressure of water. Alternatively, the pressure of the pressurized water stream 118 may be between 22.1 MPa and 32 MPa, or between 22.9 MPa and 31.1 MPa, or between 23 MPa and 30 MPa, or between 24 MPa and 28 MPa. In some embodiments, the pressure of the pressurized water stream 118 may be 25 MPa and 29 MPa, 26 MPa and 28 MPa, 25 MPa and 30 MPa, 26 MPa and 29 MPa, or 23 MPa and 28 MPa.

Referring again to FIGS. 1-3, the pressurized water stream 118 may then be heated in water pre-heater 122 to create a supercritical water stream 126. The temperature of the supercritical water stream 126 is greater than about 374° C., which is approximately the critical temperature of water. Alternatively, the temperature of the supercritical water stream 126 may be between 374° C. and 600° C., or between 400° C. and 550° C., or between 400° C. and 500° C., or between 400° C. and 450° C., or between 450° C. and 500° C. In some embodiments, the maximum temperature of the supercritical water stream 126 may be 600° C., as the mechanical parts in the supercritical reactor system may be affected by temperatures greater than 600° C.

Similar to the petroleum pre-heater 120, suitable water pre-heaters 122 may include a natural gas fired heater, a heat exchanger, and an electric heater. As shown, the water pre-heater 122 may be a unit separate and independent from the petroleum pre-heater 120.

As mentioned, supercritical water has various unexpected properties as it reaches its supercritical boundaries of temperature and pressure. For instance, supercritical water may have a density of 0.123 grams per milliliter (g/mL) at 27 MPa and 450° C. In comparison, if the pressure was reduced to produce superheated steam, for example, at 20 MPa and 450° C., the steam would have a density of only 0.079 g/mL. At that density, the hydrocarbons may react with superheated steam to evaporate and mix into the liquid phase, leaving behind a heavy fraction that may generate coke upon heating. The formation of coke or coke precursor may plug the lines and must be removed. Therefore, supercritical water is superior to steam in some applications.

Referring again to FIGS. 1-3, the supercritical water stream 126 and the pressurized, heated petroleum-based stream 124 may be mixed in a mixing device 130 to produce a combined feed stream 133. The mixing device 130 can be any type of equipment capable of mixing the supercritical water stream 126 and the pressurized, heated petroleum-based stream 124. In one embodiment, mixing device 130 may be a mixing tee, homogenizing mixer, an ultrasonic mixer, a small continuous stir tank reactor (CSTR), or any other suitable mixer.

The volumetric flow ratio of supercritical water to hydrocarbons fed to the mixing device may vary. In one embodiment, the volumetric flow ratio may be from 10:1 to 1:1, or 5:1 to 1:1, or 4:1 to 1:1 at standard ambient temperature and pressure (SATP).

Referring to FIGS. 1-3, the combined feed stream 133 may then be introduced to a supercritical upgrading reactor system configured to upgrade the combined feed stream 133. As shown in FIGS. 1 and 3, the supercritical reactor system may include at least one upgrading reactor 140 (referred to as a first reactor as follows), but optionally may also include a second reactor 150. FIG. 2 depicts an embodiment having only one supercritical upgrading reactor, specifically first reactor 140. The combined feed stream 133 is fed through an inlet port of the first reactor 140. The first reactor 140 depicted in FIG. 1 is a downflow reactor where the inlet port is disposed near the top of the first reactor 140 and the outlet port is disposed near the bottom of the first reactor 140. Alternatively as shown in FIGS. 2 and 3, it is contemplated that the first reactor 140 may be an upflow reactor where the inlet port is disposed near the bottom of the reactor. As shown by flow arrow 141 in FIG. 1, a downflow reactor is a reactor where the petroleum upgrading reactions occur as the reactants travel downward through the reactor. Conversely as shown by flow arrow 241 in FIGS. 2 and 3, an upflow reactor is a reactor where the petroleum upgrading reactions occur as the reactants travel upward through the reactor.

The first reactor 140 operates at a first temperature greater than the critical temperature of water and a first pressure greater than the critical pressure of water. In one or more embodiments, the first reactor 140 may have a temperature of between 400° C. to 500° C., or between 420° C. to 460° C. The first reactor 140 may be an isothermal or nonisothermal reactor. The reactor may be a tubular-type vertical reactor, a tubular-type horizontal reactor, a vessel-type reactor, a tank-type reactor having an internal mixing device, such as an agitator, or a combination of any of these reactors. Moreover, additional components, such as a stirring rod or agitation device may also be included in the first reactor 140.

The first reactor 140 may have dimensions defined by the equation L/D, where L is a length of the first reactor 140 and D is the diameter of the first reactor 140. In one or more embodiments, the L/D value of the first reactor 140 may be sufficient to achieve a superficial velocity of fluid greater than 0.5 meter (m)/minute (min), or an L/D value sufficient to achieve superficial velocity of fluid between 1 m/min and 5 m/min. In some embodiments, a low L/D dimension may be utilized, as the plug remover may be more effective for low L/D reactors, which may additionally be more cost-effective than high L/D reactors. The L/D may vary based on the flow rate and superficial velocity. In some embodiments, a "low" L/D dimension may be less than 10, such as less than 8, less than 5, less than 2, or less than 2 for a process producing between 500 barrels per day (BPD) and 5,000 BPD. The fluid flow may be defined by a Reynolds number greater than about 5000.

The first reactor 140, and optionally, the second reactor 150 are both supercritical water reactors that employ supercritical water as the reaction medium for upgrading reactions in the absence of externally-provided hydrogen gas and in the absence of a catalyst. In certain embodiments, hydrogen gas may be generated through a steam reforming reaction and a water-gas shift reaction, which is then available for the upgrading reactions. Without being bound by any particular theory, hydrogen gas ($H_2$) may be stable and may require use of catalysts to "activate" the $H_2$ in order to be utilized in hydrogenation reactions. However, hydrogen generated from the steam reforming and water-gas shift reactions of the present embodiments may produce "active" hydrogen as an intermediate, which may be used in upgrading reactions without requiring the use of external catalysts. In some embodiments, at least one of the one or more upgrading reactors may generate hydrogen. For instance, the first reactor 140, the second reactor 150, or in some embodiments both, may generate hydrogen.

Referring again to FIGS. 1 and 3, the first reactor product 143 may then optionally be introduced to a second reactor 150. Various reactor types are contemplated for the second reactor 150. For example as shown in FIGS. 1 and 3, the second reactor 150 may be a downflow reactor as depicted by flow line 151. Conversely, the second reactor 150 may also be an upflow reactor, where reactant, such as the combined feed stream 133 is fed through a bottom port of the reactor 150 and upgraded product 153 is discharged through a top port of the reactor 150. In one or more embodiments, the second reactor 150 may utilize the same or similar operating temperature and pressure as the first reactor 140. Alternatively, the second reactor 150 may operate at a second temperature less than the temperature of the first reactor 140 but greater than the critical temperature of water, while maintaining the pressure greater than the critical pressure of water. Moreover, it is also contemplated that the second reactor 150 operates at a temperature greater than the operating temperature of the first reactor 140. The second reactor 150 also has a second pressure greater than the critical pressure of water. In one or more embodiments, the second reactor 150 may have a temperature of from 380° C. to 500° C., or from 400° C. to 450° C.

Referring again to FIGS. 1 and 3, the upgraded product 153 from the second reactor 150 may then be passed to a cooling device 160. The cooling device 160 may reduce the temperature of the upgraded product 153 to create a cooled upgraded product 163 having a temperature less than 200° C. In further embodiments, the temperature of the cooled upgraded product 163 may be cooled to from 10° C. to 150° C., or from 20° C. to 100° C. Various types of cooling devices may be utilized, for example, double tube or double pipe cooling devices.

Further as shown in FIGS. 1 and 3, the pressure of the cooled upgraded product 163 may be reduced by a pressure reducer 170 to create a cooled, depressurized stream 173. Without being limited to specific pressure ranges, the pressure reducer 170 may reduce the pressure to a pressure from 0.05 MPa to 2.2 MPa. At which point, the cooled, depressurized stream 173 may be fed to gas liquid separation units 200. These gas liquid separation units may separate the depressurized stream in a gas-liquid separator (not shown) into a gas-phase stream and a liquid-phase stream, and then separate the liquid-phase stream in an oil-water separator into a water stream and an oil product stream. For further separation, it is contemplated to introduce the oil product stream into other separator units, for example, a solvent extraction unit.

As stated previously, plugging can occur at various points throughout the process or system. Without being limited to theory, the plug remover solution is injected proximate the location where plugging happens to decrease viscosity of the fluid in the process lines and prevent further plugging reactions (for example, coking). Thus, as shown in FIGS. 1 and 2, plug remover solution may be injected into one or more injection locations at a temperature within 200° C. of a temperature of an internal fluid at the injection location and a pressure of 100% to 120% of the pressure of the internal fluid at the injection location. In this disclosure, "internal fluid" means any of the flowing fluids in the present upgrading systems, for example, the reactant streams or product streams in the process lines, reactors, or components of the present upgrading systems.

Without being limited to theory, the plug remover solution may be injected into one or more of the injection locations if there is a pressure gradient above a threshold detected. The pressure difference between locations can indicate where plugging has occurred. As shown in the FIGS., pressure measuring devices including, but not limited to, pressure gauges, pressure transducers, pressure sensors, and combinations thereof, may be installed at locations where plugging can happen. Depending on the process conditions (for example, temperature, pressure, and flow rate), in some embodiments the pressure difference should not exceed 10% of operating pressure (such as 2.5 MPa at 25 MPa or 360 psig at 3611 psig operating pressure). In some embodiments, the pressure difference should not exceed 8% of operating pressure, or should not exceed 5% of operating pressure, or should not exceed 3% of operating pressure, or should not exceed 1% of operating pressure. In some embodiments, the pressure difference should not exceed 1.5% of operating pressure or should not exceed 0.5% of operating pressure.

During operation, some pressure drop may be expected in the process 100 due to various factors, including long process lines, which may experience a drop in pressure even when no plugging has occurred. Therefore, in some embodiments, the process 100 may have an "offset" pressure drop value, which may be calculated by running the process 100 with water to determine the pressure drop experienced before plugging occurs. The "offset" pressure drop value may then be subtracted from the operating pressure to determine the baseline pressure drop experienced by the process 100. For example, if the operating pressure is 3600 psig, and during operation the pressure drop through the heat exchanger is about 10 psig and increases as much as 20 psig, (a net difference of 10 psig offset pressure) when the overall pressure drop increases to 46 psig or more (1% of 3600+10 psig) the plug remover injection pumps may be triggered to inject plug remover into the process lines.

In one or more embodiments, plug remover solution may be injected when there is a pressure drop of at least 1% in one or more sections of the process line. In the FIGS., generally one injection port is depicted on a process line. However, it is contemplated to include multiple ports across the process line. For example, if a process line location characterized by a pressure gradient is detected, plug remover solution may be injected on the process line upstream and downstream of that location. This may ensure there is sufficient flow even if there is an area of plugging within the process line. While plug remover solution may be injected at locations where the outlet port is connected to the process line, the present embodiments do not position these injection ports at the process line "ends." The present injection port may be located 10 to 90% of the distance of the process lines. Thus, if the process line extends 10 meters (m) from end to end, the injection port(s) may be positioned anywhere from the 1 m mark to the 9 m mark, thereby providing a 1 meter gap at each end of the process line. The plug remover solution may be injected near the process line ends to allow the plug remover solution to be mixed with fluid to improve the efficiency of the plug remover solution. Without intent to be bound by any theory, leaving greater than or equal to 1 m of space at each end of the 10 m process line may allow sufficient space and sufficient time to mix the plug remover solution with fluid, such as internal fluid.

In some embodiments, it is contemplated to gradually increase the flow rate of plug remover solution in stepwise fashion. For example, it is contemplated that plug remover solution may be injected into an injection port at a first flow rate for a first duration (for example, 0.1 milliliters (mL)/minute (min) for 1 minute). Then, the plug remover solution may be injected into the injection port at a second flow rate for a second duration (for example, 0.5 mL/min for 1 minute). With this stepwise process, the system can reduce a pressure gradient in a process line while minimizing the delivery of excess plug remover solution to the system.

Stepwise injection is also contemplated to be included in multiple ports along a process line. As a non-limiting example, if plugging occurred at the cooling device 160, one of many possible remedies may include injecting purging fluid at process line 198 at 0.01% of the total internal fluid flow rate. The fluid may be gradually increased to a flow rate of 0.05% of the total internal fluid flow rate over a five minute interval. If the plug has still not subsided, purging fluid may be injected at process line 197 at 0.005% of the total internal fluid flow rate, increasing to 0.01% over a five minute interval. After the pressure drop through the cooling device 160 returns to normal, indicating that the plug was cleared, the fluid flow rate of process line 198 may be decreased from 0.05% to 0% over a ten minute interval. After the ten minute interval, the fluid flow rate of process line 197 may be decreased from 0.05% to 0% over a ten minute interval to return the system back to the original pre-plugging state.

The plug remover solution may comprise an aromatic solvent and less than 500 ppm of water and less than 5,000 ppm of sulfur, nitrogen, oxygen, and metal content, respectively. In specific embodiments, the aromatic solvent may comprise at least one phenyl ring, and at least one substituted alkyl, cycloalkyl, or alkenyl group having less than 10 carbons attached to the phenyl ring. In one or more embodiments, the aromatic solvent may include alkyl substituted phenyl compounds such as toluene, hexylbenzene or combinations thereof. Alternatively, the aromatic solvent may include cycloalkyl substituted phenyl compounds such as tetralin. In embodiments in which the petroleum-based composition 105 comprises hydrocarbons with a boiling point above about 370° C., such as atmospheric residue, toluene may not be present in the combined feed stream 133. Therefore, in some embodiments, the plug remover may be obtained from the plug remover storage tank 180, which may not produced from unreacted product from the combined feed stream 133, as may be seen in other conventional methods. This may save time and costs required to separate and purify plug remover solution from the combined feed stream 133.

Without being bound by theory, the aromatic solvent may be selected based on boiling point. For example, toluene has a boiling point of 110.6° C., while tetralin with a boiling point at 207° C. and hexylbenzene has a boiling point on 226° C. Consequently, in some embodiments, lower boiling point solvents, such as toluene, may be more suitable for injection in lower temperature process lines or components, whereas higher boiling point solvents, such as tetralin, may be more suitable for injection in higher temperature process lines or components, such as the supercritical reactors. In some embodiments, the process 100 may have multiple plug remover solvents injected at various ports. In some embodiments, low boiling point aromatic solvents may be more suitable to handle plugs occurring at low temperatures (such as process line 197 as shown in FIG. 1), while high boiling point aromatics may be more suitable for high temperature sections (such as process line 195, as shown in FIG. 1).

In embodiments in which multiple ports and multiple solvents may be used, the process 100 may utilize two or more storage tanks to accommodate two solvents, such as, for example, toluene and tetralin. Likewise, multiple and independent metering pumps may be utilized for the various ports, which may, in some embodiments, have separate individual heaters 184. In other embodiments, a single metering pump may be used. In some embodiments, a single pup may be used with a splitter to supply plug remover to multiple ports. Any splitter known in the industry may be suitable, for example a tee or cross-fitting. In some embodiments, the splitter may be a controllable splitter, which may have a flow controller such as an electro-pneumatic control valve for controlling the flow rate of the purging fluid.

As stated previously, the temperature and pressure at which the plug remover solution is injected is dependent on the injection location, specifically the temperature, pressure, and flow rate of the injection location. In one or more embodiments, the temperature of the plug remover solution may be within 200° C. of the internal fluid temperature of the injection point, or within 150° C. of the internal fluid temperature of the injection point, or within 100° C. of the internal fluid temperature of the injection point, or within 50° C. of the internal fluid temperature of the injection point, or within 25° C. of the internal fluid temperature of the injection point. For example, if plug remover solution is injected into a heat exchanger inlet which is operating at 300° C. at normal unplugged condition, the plug remover fluid may be in the range of 100° C. to 500° C., which is within 200° C. of the operating temperature of the heat exchanger inlet.

Moreover, the pressure of the plug remover solution may be a pressure of from 100% to 120% of the pressure of the internal fluid at the injection location. In this case, if plug remover solution is injected into a heat exchanger inlet which is operating at approximately 25 MPa at normal unplugged condition, the plug remover fluid may be in injected at a pressure in the range of 25 to 30 MPa, which is 100% to 120%, respectively, of the pressure of the internal fluid at the injection location.

Furthermore, the flow rate of the plug remover solution may be injected at a flow rate of 0.001% to 10% of the flow rate of internal fluid temperature at the injection point. For example, if the flow rate of internal fluid is 100 liters per hour (L/hr) at standard ambient temperature and pressure (SATP), the flow rate of the plug remover solution should be in the range of 0.001 to 10 L/hr, which is 0.001% to 10% of the flow rate of the internal fluid. While 0.001% may seem minuscule, disruption and perturbation of the process 100 should be minimized and avoided at all costs, thus, a rate of 0.001% of the internal fluid flow rate is a practical minimum flow to begin the injection process.

Referring to the embodiments of FIGS. 1-3, the system embodiments for injecting plug remover solution may include one or more components such as a plug remover storage tank 180, a metering pump 182 in fluid communication with plug remover storage tank 180, and a heat exchanger 184 which can adjust the temperature of the plug remover solution to be injected. Further as shown in FIGS. 1 and 2, the process 100 may include a plug remover distributor 190, which is directed to controlling the flow of plug remover solution into one or more injection ports. It is contemplated that the plug remover distributor 190 may include various components, which help ensure that the plug remover solution is injected into the injection ports at the desired temperature, pressure, and flow rate. Thus, the plug remover distributor 190 may include various temperature sensors, pressure sensors, pressure transducers, valves, and flow rate sensors. Moreover, the plug remover distributor 190 may be communicatively coupled to the previously described plug remover components as well as the pressure sensors, pressure gauges, or pressure transducers disposed at various locations within the upgrading system. Thus, the plug remover distributor 190 may include a control system comprised of a controller, such as a programmable logic controller (PLC), a processor, for example, a microprocessor, or similar control mechanisms. The control mechanism, such as a programmable logic controller, may determine the injection time (start time, end time, or both), injection rate (such as the volumetric rate of the purging fluid), or both. The PLC may, in some embodiments, have a proportional-integral-derivative (PID) controller to minimize the disruption or perturbation of the process 100. This may allow the PLC controller to determine the temperature, flow rate, and pressure of the plug remover.

In some embodiments, the temperature of the plug remover may be controlled by a controller, such as a PLC, the heater 184, or both. When the plug remover is processing, the temperature of the internal fluid may begin to deviate. To restore or otherwise alter the internal fluid temperature, the temperature of the plug remover fluid may be controlled. In some embodiments, plugging in the heat exchanger may decrease the temperature of the internal fluid due to a decreased flow rate into the heat exchanger. Too low of a temperature can alter the viscosity of the internal fluid, which may perpetuate another pressure drop through control valve 170. Therefore, in some embodiments, the plug remover solution may have a higher temperature than the temperature of the internal fluid. In other embodiments, such as if the internal temperature is higher than desired, the temperature of the plug remover solution may have a lower temperature than that of the temperature of the internal fluid to reduce the temperature of the internal fluid.

As stated previously, injection ports may be disposed in various locations of the upgrading system. For example as shown in FIGS. 1-3, at least one injection port may be disposed on the process line connecting the pump 112 (which pressurizes the petroleum-based composition 105) with the petroleum pre-heater 120 (which heats the pressurized, petroleum-based composition 116). As shown in FIGS. 1-3, the plug remover injection line 191 delivers plug remover solution to the one or more injection ports along the process line with the head of arrow 191 indicating the location of an injection port.

Similarly, at least one injection port may be disposed on the process line connecting the pump 114 (which pressurizes water stream 110) with the water pre-heater 122 (which heats the pressurized water stream 118). As shown in FIGS. 1-3, the plug remover injection line 192 delivers plug remover solution to the one or more injection ports along the process line with the head of arrow 192 indicating the location of an injection port.

As shown, the petroleum pre-heater 120 and the water pre-heater 122 may include pressure measuring devices 125 and 127, respectively, which detect pressure gradients or pressure drops across the flow path within the petroleum pre-heater 120 and the water pre-heater 122. While not shown, it is contemplated that additional pressure measuring devices may be coupled to pumps 112 and 114 and the process lines adjacent therewith. Various suitable pressure measuring devices are contemplated, for example, pressure sensors, pressure gauges, pressure transducers, and the like. As will be described in detail as follows, the pressure measuring device may be communicatively coupled to the plug remover distributor 190, and as such may transmit the pressure readings or pressure gradient to the plug remover distributor 190. Based on these pressure readings, the plug remover distributor 190 may require the injection of plug remover solution at an injection port proximate a process line location where a pressure drop is detected.

As shown in FIGS. 1-3, the pressure gradient between the first reactor 140 and the second reactor 150 may be detected by pressure sensors 142 and 152, respectively. In the embodiment of FIG. 1, there may be a processor 145 in communication with pressure sensors 142 and 152 that calculates the difference between pressure sensors 142 and 152. As shown in FIG. 1, the processor 145 may transmit the pressure reading to the plug remover distributor 190 as shown by dotted line 147. Alternatively, as shown in FIG. 2, the readings from pressure sensors 142 and 162 transmit pressure readings directly to the plug remover distributor 190 as shown by dotted lines 148 and 164, respectively.

Referring again to FIGS. 1-3, the plug remover solution may also be delivered to at least one injection port on a process line connecting the petroleum pre-heater 120 with the mixing device 130. As shown, the plug remover injection line 194 may deliver plug remover solution to the one or more injection ports along the process line with the head of arrow 194 indicating the location of an injection port. Similarly, as shown, plug remover solution may also be delivered to at least one injection port on a process line connecting the water pre-heater 122 with the mixing device 130. The plug remover injection line 193 may deliver plug remover solution to the one or more injection ports along the process line with the arrow of 193 indicating the location of an injection port. As shown, the mixing device 130 may include a pressure sensor 131 used to detect plugging within the mixing device 130. If an unacceptable pressure reading or pressure gradient is detected by pressure sensor 131, the plug remover distributor 190 may trigger the injection of plug remover solution through either or both of plug remover injection lines 193 and 194.

Further, as shown in FIGS. 1-3, one or more injection ports may also be located on a process line connecting the mixing device 130 with the first reactor 140, where the plug remover solution is delivered by plug remover injection line 195 upstream of the first reactor 140. For the two supercritical upgrading reactor systems of FIGS. 1 and 3, it is also contemplated to deliver plug remover solution through plug remover injection line 196 at an injection port downstream of the first reactor 140 but upstream of second reactor 150. Referring to FIGS. 1 and 3, the possibility of coke formation within the first reactor 140 makes it beneficial to include pressure sensors 142 proximate the first reactor 140. Similarly as shown in FIGS. 1 and 3, a pressure sensor 152 may also be included proximate the second reactor 150.

Furthermore, as shown in FIGS. 1-3, an injection port may be disposed on a process line connecting the first reactor 140 or second reactor 150 with the cooling device 160. The plug remover solution may be injected through plug remover injection line 198. As shown, the cooling device 160 may also include one or more proximate pressure sensors 162, which may detect pressure gradients within the cooling device 160. Moreover, an injection port may also be disposed on a process line connecting the cooling device 160 with the pressure reducer 170. The plug remover solution may be injected through plug remover injection line 197. As shown, the pressure reducer 170 may also include one or more proximate pressure sensors 172.

In one or more embodiments, the plug remover solution may be injected into two or more, or three or more of the injection locations.

Examples

Referring to FIG. 3, the following experimental examples illustrate one or more features of the embodiments of the present disclosure. Specifically, there are two examples, one Comparative Example which does not include plug remover injection and a Present Example, wherein plug remover solution is injected to reduce plugging, were simulated. With the exception of the plug remover, both examples undergo a similar upgrading process. Referring to FIG. 3, the feed oil (that is, petroleum-based composition 105) was atmospheric residue from Arabian Medium crude oil having an American Petroleum Institute (API) Gravity of 12.8, and a total sulfur content of 4.1 wt %. Furthermore, the petroleum-based composition 105 has a vacuum residue fraction of 43 wt % as estimated by SIMDIS, based on the American Society for Testing and Materials (ASTM) 7169 method.

The petroleum-based composition 105 and water stream 110 were pumped to 27 MPa with high pressure metering pumps, 112 and 114, respectively. The flow rates of the petroleum-based composition 105 and the water stream 110 were 0.2 L/hr and 0.8 L/hr, respectively. The pressurized, petroleum-based composition 116 and the pressurized water stream 118 were heated to 110° C. and 380° C. with pre-heaters 120 and 122, respectively. Referring again to FIG. 3, the supercritical water stream 126 and the pressurized, heated petroleum-based stream 124 may be mixed in a tee fitting mixing device 130 to produce a combined feed stream 133. The combined feed stream 133 was injected into reactors 140 and 150 which were connected in series. The first reactor 140 was upflow and the second reactor 150 was downflow. The upgraded product 153 from the second reactor 150 was cooled down by double tube type cooling device 160, where cold water having a temperature of 15° C. flows in the outside tube. The cooled upgraded product 163 was released to atmospheric pressure by a back pressure regulator pressure reducer 170. The cooled, depressurized stream 173 from the back pressure regulator 170 underwent further separation operations through the gas liquid separation units 200. Specifically, the cooled, depressurized stream 173 having a temperature of less than 75° C. was separated to gas and liquid by a gas-liquid separator which was a 500 milliliter (mL) vessel having three ports (top, middle and bottom). Gas from the top port was measured by a wet test meter and analyzed by gas chromatography. The wet test meter used was a Ritter Drum-type Gas Meter, used to measure gas flow rate utilizing a positive displacement based on a rotating drum and liquid in a housing. Liquid product was separated to oil and water by a centrifuge unit.

In the Present Example, the plug remover solution was toluene with less than 0.03 wt % (300 ppm) water. The threshold pressure difference was set to 1 MPa. The pressure difference occurred between the first reactor 140 and the cooling device 160. The pressure readings from pressure sensors 142 and 162 were 28 MPa and 27 MPa. After detecting a pressure difference between these pressure sensors 142 and 162, the metering pump 182 injected plug remover fluid through injection line 199. The temperature of the injection line was set to 100° C., and the metering pump 182 pressure was set to produce a plug remover pressure equal or slightly higher than the pressure of the 28 MPa pressure detected by pressure sensor 162. The flow rate of the plug remover solution was programmed to gradually increase.

Specifically, the plug remover solution was injected in line 199 at a flow rate of 3 mL/hr at 60 seconds and then had a flow rate of 6 mL/hr after 120 seconds. Additionally, plug remover solution was injected in line 197 at a flow rate of 3 mL/hr at 60 seconds, and then had a flow rate of 6 ml/hour after 120 seconds. After the pressure difference between pressure sensors 142 and 162 decreased below 0.1 MPa, both injections were stopped.

In the Comparative Example where no plug remover solution was utilized, the process experienced large pressure difference between the first reactor 140 and the cooling device 160, specifically reaching a pressure difference of 2 MPa. After reaching pressure gradient of 2 MPa, the system was shut down. Without the addition of plug remover solution, the total operation time before undesirable plugging was less than 16 hours.

In contrast, by injecting plug remover solution as in the previous example, the process of the Present Example ran for over 120 hours, and shut down was a voluntary weekend shutdown, not a shutdown caused by unsuitable pressure gradients.

Figure 4:
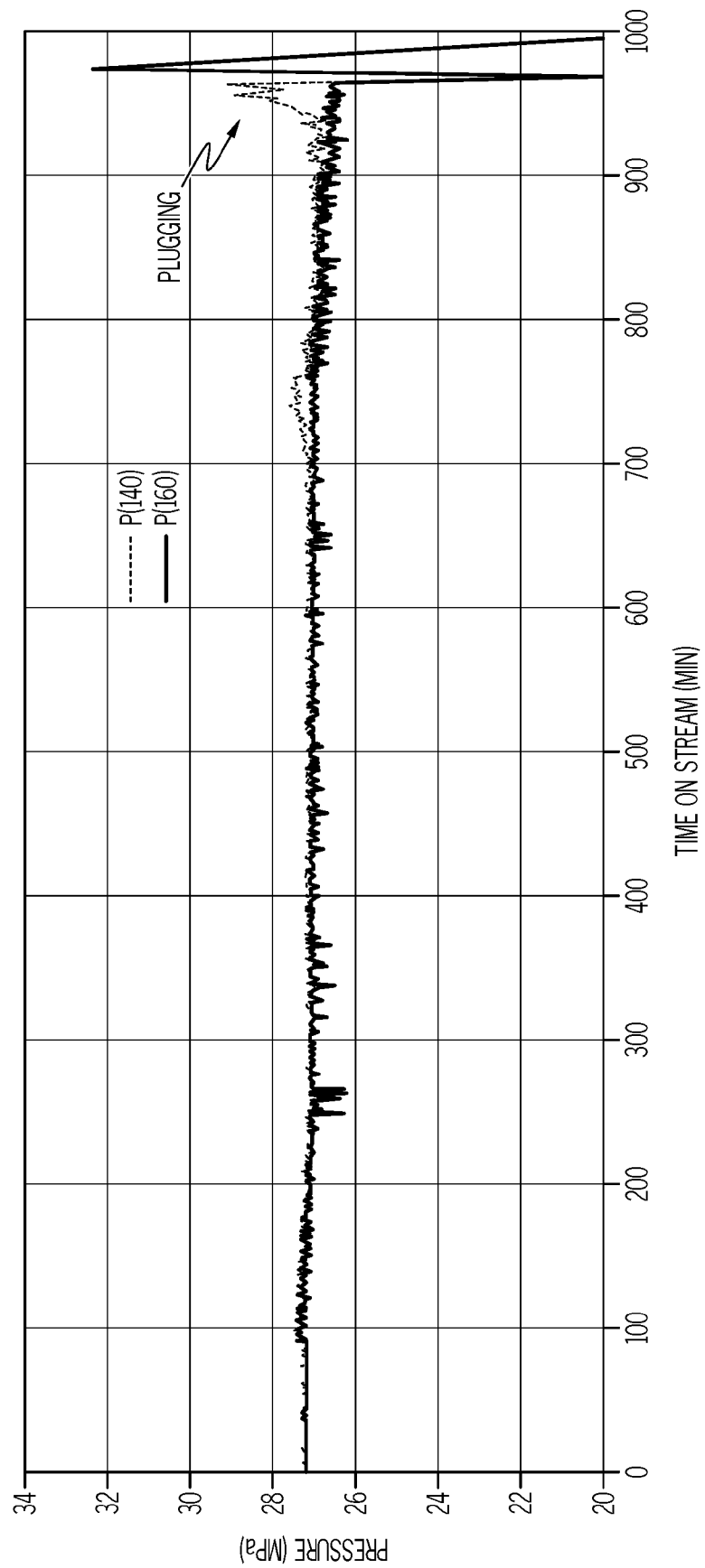
FIG. 4 is a graphical illustration of the pressure over time for comparative simulations provided in the Examples as follows, wherein plug remover is not injected into the upgrading reactor systems.

The effect of plugging is illustrated in the graphical illustration of FIG. 4, which shows the system pressure over the first 1,000 minutes of operation. The illustrated data in FIG. 4 for the failed run was obtained from pressure sensors 142 and 162, which detected pressure gradients in the first reactor 140 and the cooling device 160, respectively. As shown, the P(140) curve started to increase due to some plug in the outlet port of reactor 140. The sharp decrease of the P(140) and (P160) curves is shown at around 960 min due to pressure control valve failure caused by plugging of a valve seat. After a sharp decrease, the pressure increased again and then decreased. Such sharp fluctuations were caused by the valve failure.

The product of the present example after 120 hours operation had an API gravity of 20.8, a total sulfur content of 3.3 wt %, and a vacuum residue fraction of 21 wt % (estimated by Simulated Distillation (SIMDIS)), based on ASTM 7169 method.

It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A process for upgrading a petroleum-based composition while decreasing plugging comprising:
   mixing a supercritical water stream with a pressurized, heated petroleum-based composition in a mixing device to create a combined feed stream;
   introducing the combined feed stream to an upgrading reactor system to produce an upgraded product, where the upgrading reactor system operates at a temperature greater than a critical temperature of water and a pressure greater than a critical pressure of water, and where the upgrading reactor system comprises one or more upgrading reactors;
   passing the upgraded product out of the upgrading reactor system;
   cooling the upgraded product with a cooling device to create a cooled upgraded product having a temperature less than 200° C.;
   decreasing the pressure of the cooled upgraded product with a pressure reducer to create a cooled, depressurized stream having a pressure from 0.05 megapascals (MPa) to 2.2 MPa; and
   injecting plug remover solution into two or more injection locations at a temperature within 200° C. of a temperature of an internal fluid at the injection locations and a pressure of 100% to 120% of the pressure of the internal fluid at the injection location, where the plug remover solution comprises an aromatic solvent and less than 500 parts per million (ppm) of water, and where the injection locations include two or more of:
   an injection port on a process line connecting the mixing device with the upgrading reactor system;
   an injection port on a process line connecting the upgrading reactor system with the cooling device; or
   an injection port on a process line connecting the cooling device with the pressure reducer.

2. The process of claim 1, where the supercritical water stream is produced by feeding water to a first pump and a first heating device downstream of the first pump, and the pressurized, heated petroleum-based composition is produced by feeding the petroleum-based composition to a second pump and a second heating device downstream of the second pump, where the pressurized, heated petroleum-based composition is at a temperature greater than 50° C.

3. The process of claim 2, further comprising injecting plug remover solution at one or more of the following injection locations:
   at least one injection port on a process line connecting the first pump with the first heating device;
   at least one injection port on a process line connecting the second pump with the second heating device;
   at least one injection port on a process line connecting the first heating device with the mixing device; or
   at least one injection port on a process line connecting the second heating device with the mixing device.

4. The process of claim 1, where the plug remover solution is injected into one or more of the injection locations if there is a detected pressure gradient above a threshold level.

5. The process of claim 4, where the threshold level is a pressure drop of at least 1% in one or more sections of
   the process line connecting the mixing device with the upgrading reactor system;
   the process line connecting the upgrading reactor system with the cooling device;
   the process line connecting the cooling device with the pressure reducer; or
   combinations thereof.

6. The process of claim 1, where the process lines include multiple injection ports.

7. The process of claim 1, where the plug remover solution is injected in stepwise fashion, such that a flow rate of the plug remover solution is gradually increased.

8. The process of claim 1, where plug remover solution is injected at injection locations upstream and downstream of a pressure gradient on one or more sections of
   the process line connecting the mixing device with the upgrading reactor system;
   the process line connecting the upgrading reactor system with the cooling device;

the process line connecting the cooling device with the pressure reducer; or combinations thereof.

9. The process of claim 1, where the upgrading reactor system comprises at least two supercritical upgrading reactors.

10. The process of claim 1, further comprising injecting plug remover solution into an injection port on a process line connecting a first reactor and a second reactor downstream of the first reactor.

11. The process of claim 1, where the plug remover solution is heated prior to injection.

12. The process of claim 1, where the plug remover solution is injected when there is a pressure gradient between the upgrading reactor system and the cooling device.

13. The process of claim 1, further comprising one or more pressure measuring devices.

14. The process of claim 1, where the plug remover solution comprises toluene.

15. The process of claim 1, where at least one of the one or more upgrading reactors generates hydrogen.

16. The process of claim 1, where the upgrading reactor system lacks an external supply of hydrogen gas and catalyst.

17. The process of claim 1, where the upgrading reactor system includes a first reactor and a second reactor downstream of the first reactor.

18. The process of claim 17, where a ratio of a volume of the first reactor to a volume of the second reactor is 0.1:1 to 1:1.

19. The process of claim 17, where the first reactor has dimensions defined by the equation L/D, where L is the length of the first reactor and D is the diameter of the first reactor, where the L/D is sufficient to achieve superficial velocity of fluid greater than 0.5 meter/min.

20. A process for upgrading a petroleum-based composition while decreasing plugging comprising:

mixing a supercritical water stream with a pressurized, heated petroleum-based composition in a mixing device to create a combined feed stream;

introducing the combined feed stream to an upgrading reactor system to produce an upgraded product, where the upgrading reactor system operates at a temperature greater than a critical temperature of water and a pressure greater than a critical pressure of water, and where the upgrading reactor system comprises one or more upgrading reactors;

passing the upgraded product out of the upgrading reactor system;

cooling the upgraded product with a cooling device to create a cooled upgraded product having a temperature less than 200° C.;

decreasing the pressure of the cooled upgraded product with a pressure reducer to create a cooled, depressurized stream having a pressure from 0.05 megapascals (MPa) to 2.2 MPa; and injecting plug remover solution into one or more injection locations on one or more process lines at a temperature within 200° C. of a temperature of an internal fluid at the injection location and a pressure of 100% to 120% of the pressure of the internal fluid at the injection location, where the plug remover solution comprises an aromatic solvent and less than 500 parts per million (ppm) of water, where the process lines define a length, and where the injection locations are one or more injection ports positioned from 10 to 90% of the length of the one or more process lines, the injection ports including one or more of:

an injection port on a process line connecting the mixing device with the upgrading reactor system;

an injection port on a process line connecting the upgrading reactor system with the cooling device; or an injection port on a process line connecting the cooling device with the pressure reducer.

21. The process of claim 20, where plug remover solution is injected into at least two of the injection locations.

22. The process of claim 21, where the supercritical water stream is produced by feeding water to a first pump and a first heating device downstream of the first pump, and the pressurized, heated petroleum-based composition is produced by feeding the petroleum-based composition to a second pump and a second heating device downstream of the second pump, where the pressurized, heated petroleum-based composition is at a temperature greater than 50° C.

23. The process of claim 20, further comprising injecting plug remover solution at one or more of the following injection locations:

at least one injection port on a process line connecting the first pump with the first heating device;

at least one injection port on a process line connecting the second pump with the second heating device;

at least one injection port on a process line connecting the first heating device with the mixing device; or at least one injection port on a process line connecting the second heating device with the mixing device.

24. The process of claim 20 where the plug remover solution is injected into one or more of the injection locations if there is a detected pressure gradient above a threshold level.

25. The process of claim 24, where the threshold level is a pressure drop of at least 1% in one or more sections of the process line connecting the mixing device with the upgrading reactor system;

the process line connecting the upgrading reactor system with the cooling device;

the process line connecting the cooling device with the pressure reducer; or combinations thereof.

26. The process of claim 20, where the process lines include multiple injection ports.

27. The process of claim 20, where plug remover solution is injected at injection locations upstream and downstream of a pressure gradient on one or more sections of the process line connecting the mixing device with the upgrading reactor system;

the process line connecting the upgrading reactor system with the cooling device;

the process line connecting the cooling device with the pressure reducer; or combinations thereof.

28. The process of claim 20, further comprising injecting plug remover solution into an injection port on a process line connecting a first reactor and a second reactor downstream of the first reactor.

29. The process of claim 20, where the plug remover solution is injected when there is a pressure gradient between the upgrading reactor system and the cooling device.

* * * * *